United States Patent
Lu et al.

(10) Patent No.: US 8,901,525 B2
(45) Date of Patent: Dec. 2, 2014

(54) PANEL ALIGNMENT APPARATUS AND PANEL ALIGNMENT METHOD

(75) Inventors: Jiasheng Lu, Shenzhen (CN); Teng-chou Wei, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 789 days.

(21) Appl. No.: 13/143,244

(22) PCT Filed: May 12, 2011

(86) PCT No.: PCT/CN2011/074015
§ 371 (c)(1),
(2), (4) Date: Jul. 5, 2011

(87) PCT Pub. No.: WO2012/151758
PCT Pub. Date: Nov. 15, 2012

(65) Prior Publication Data
US 2012/0287260 A1    Nov. 15, 2012

(30) Foreign Application Priority Data
May 9, 2011 (CN) .......................... 2011 1 0118620

(51) Int. Cl.
*H04N 7/18*    (2006.01)
*G02F 1/13*    (2006.01)
*G02F 1/1333*    (2006.01)

(52) U.S. Cl.
CPC .. *G02F 1/1303* (2013.01); *G02F 2001/133354* (2013.01)
USPC ................. 250/548; 250/559.44; 324/750.16; 324/750.23; 324/760.01; 348/95; 349/191

(58) Field of Classification Search
CPC . G02F 1/133; G02F 1/1333; G02F 1/133308; G01R 31/02; G01N 21/86; G01N 21/8806
USPC ................. 250/548, 559.04, 559.07, 559.08, 250/559.4, 559.44; 324/750.16, 750.19, 324/750.23, 757.01, 760.01; 348/94, 95; 349/191, 192
See application file for complete search history.

(56) References Cited

U.S. PATENT DOCUMENTS 5,825,500 A * 10/1998 Iino et al. ...................... 356/394
6,827,788 B2    12/2004 Takahashi

FOREIGN PATENT DOCUMENTS

| CN | 1815319 A | 8/2006 |
|---|---|---|
| CN | 101225505 A | 7/2008 |
| CN | 101543811 A | 9/2009 |
| JP | 2002160824 A | 6/2002 |

* cited by examiner

*Primary Examiner* — Kevin Pyo
(74) *Attorney, Agent, or Firm* — Mark M. Friedman

(57) ABSTRACT

The present invention provides a panel alignment apparatus and a panel alignment method. The panel alignment apparatus comprises an image detection device and a first clamp. The method comprises the following steps: utilizing the image detection device to detect a position of a display panel, and to calculate a position adjustment value; and utilizing the first clamp to hold the standing display panel, and to rotate the display panel according to the position adjustment value for adjusting a position of the display panel. The present invention can utilize the clamps to precisely align the standing display panel.

10 Claims, 7 Drawing Sheets

PANEL ALIGNMENT APPARATUS AND PANEL ALIGNMENT METHOD

FIELD OF THE INVENTION

The present invention relates to a panel alignment apparatus and a panel alignment method, and more particularly to a panel alignment apparatus a method for aligning a standing panel.

BACKGROUND OF THE INVENTION

Liquid crystal displays (LCDs) have been widely applied in electrical products. Currently, most of LCDs are backlight type LCDs which comprise a liquid crystal panel and a backlight module.

The liquid crystal panel is composed of two transparent substrates and a liquid crystal sealed there-between. In an assembly process of the liquid crystal panel, the panel may be processed in a standing status. For example, when bonding two polarizer films on the transparent substrates of the panel, the panel may be in the standing status for bonding the polarizer films to the two opposite sides of the panel at the same time.

In general, when the panel is processed in the standing status, the panel may be held and positioned by rollers or suckers. However, when the panel is held on the rollers, a higher cutting precision of the panel and a high roller quality are required. If the higher cutting precision of the panel or the high roller quality is poor, a positioning error of the standing panel is likely to occur. Furthermore, when a friction between the holding rollers and the panel is too large, dead pixels are likely to occur on the panel. When the panel is held by the suckers, the suckers need a very high flatness. Besides, a friction between the suckers and the panel is also too large, thus easily damaging the suckers, and particles are likely to occur on panel.

As a result, it is necessary to provide a panel alignment apparatus and a panel alignment method to solve the problems existing in the conventional technologies, as described above.

SUMMARY OF THE INVENTION

The present invention provides a panel alignment apparatus and a panel alignment method to solve the alignment problems of the standing panel.

A primary object of the present invention is to provide a panel alignment apparatus for aligning a standing display panel, wherein the display panel has a peripheral non-displaying region, and the panel alignment apparatus comprises: an image detection device configured to detect a position of the display panel, and to calculate a position adjustment value; and a first clamp configured to hold the standing display panel at the peripheral non-displaying region, and to rotate the standing display panel according to the position adjustment value calculated by the image detection device for adjusting a position of the display panel.

Another object of the present invention is to provide a panel alignment method for aligning a standing display panel, wherein the method comprises the following steps: utilizing an image detection device to detect a position of the display panel, and to calculate a position adjustment value; and utilizing a first clamp to hold the standing display panel at a peripheral non-displaying region thereof, and to rotate the standing display panel according to the position adjustment value calculated by the image detection device for adjusting a position of the display panel.

In one embodiment of the present invention, the panel alignment apparatus further comprises transport devices configured to transport the standing display panel to a predetermined position.

In one embodiment of the present invention, the alignment detector is an image detection device for capturing an image of alignment marks of the display panel and calculating a position adjustment value according to an image data of the alignment marks.

In one embodiment of the present invention, the peripheral non-displaying region is a black matrix region.

In one embodiment of the present invention, the first clamp is an L-shaped clamp configured to clamp the display panel at a corner thereof.

In one embodiment of the present invention, the first clamp is a trapezoid or rectangular clamp configured to clamp the display panel at one side thereof.

In one embodiment of the present invention, the first clamp comprises a recess and buffer layers, and the buffer layers are formed on inner sidewalls of the recess.

In one embodiment of the present invention, the panel alignment apparatus further comprises at least one second clamp configured to hold the standing display panel at the peripheral non-displaying region, wherein the second clamp is allowed to be passively rotated or moved when the standing display panel is rotated.

In one embodiment of the present invention, the second clamp is a trapezoid or rectangular clamp configured to clamp the display panel at one side thereof.

In one embodiment of the present invention, the panel alignment method further comprises the following step: utilizing transport devices to transport the standing display panel to a predetermined position before detecting the position of the display panel.

In one embodiment of the present invention, the panel alignment method further comprises the following step: utilizing at least one second clamp to hold the display panel at a first side and a second side thereof before utilizing the first clamp to hold the display panel.

In comparison with he problems existing in the conventional standing panel alignment machine, the panel alignment apparatus and the panel alignment method of the present invention can utilize the clamps to precisely align the standing panel for enhancing the position precision and reducing the particles on the panel. Moreover, the quantity of the clamps of the panel alignment apparatus is less, thereby making it easier to maintain.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
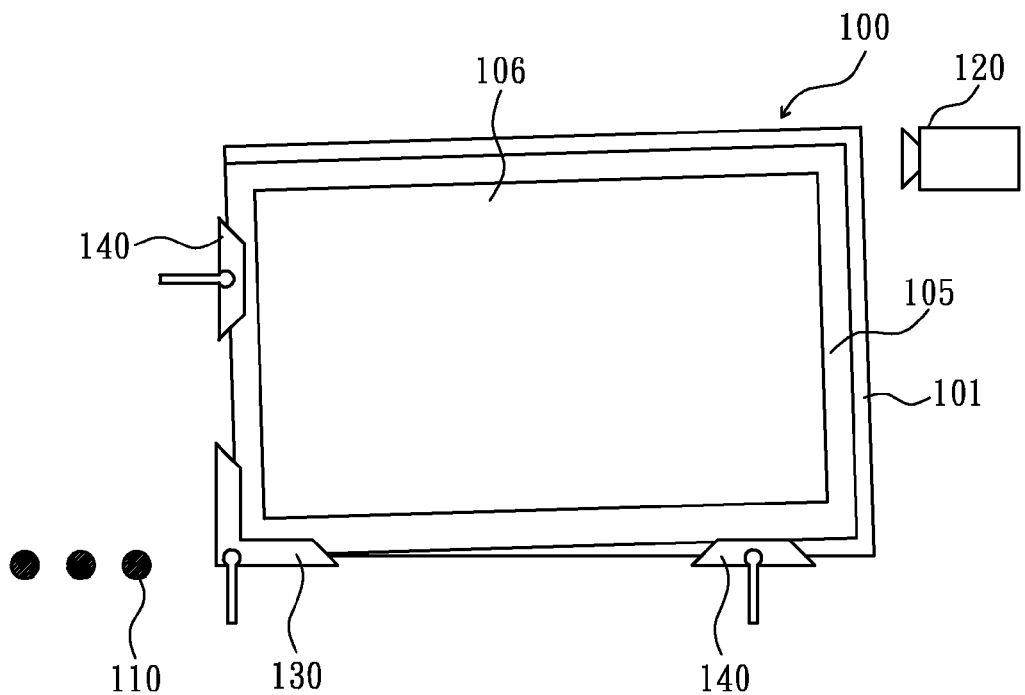
FIG. 1 is a schematic diagram showing a panel alignment apparatus according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Figure 2:
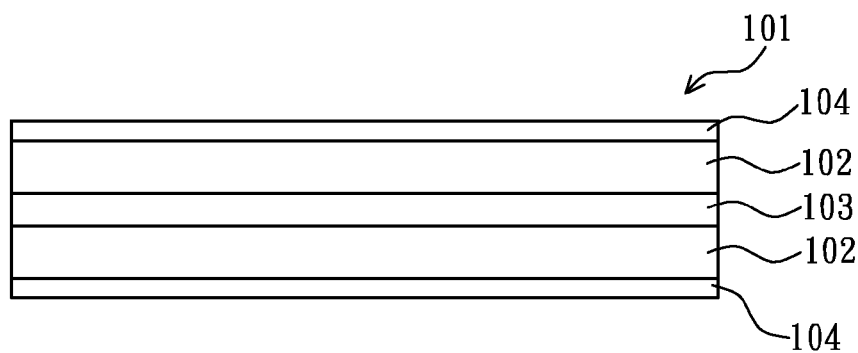
FIG. 2 is a cross-sectional view showing a display panel according to the first embodiment of the present invention.

Referring to FIG. 1 and FIG. 2, FIG. 1 is a schematic diagram showing a panel alignment apparatus according to a first embodiment of the present invention, and FIG. 2 is a cross-sectional view showing a display panel according to the first embodiment of the present invention. The panel alignment apparatus 100 is used to align a standing display panel 101 for allowing the display panel 101 to be processed in a standing status. For example, in this embodiment, the display panel 101 may be a liquid crystal display panel. At this time, the display panel 101 may comprise two substrates 102, a liquid crystal layer 103 and two polarizers 104. The substrates 102 may be glass substrates or flexible plastic substrates. The substrates 102 may be a glass substrate or other material substrate with color filters (CF) and a glass substrate or other material substrate with a thin film transistor (TFT) array. It notes that the CF and the TFT array may also be disposed on the same substrate in other embodiments. The liquid crystal layer 103 is formed between the substrates 102, and the polarizers 104 are arranged on the external sides of the substrates 102, respectively. When bonding the polarizers 104 to the substrates 102, the substrates 102 with the sealed liquid crystal layer 103 are held in the standing status (the standing display panel) for allowing the two polarizers 104 to be bonded to the external sides of the substrates 102 at the same time. A rigorous alignment relation is required between the polarizers 104 and liquid crystal molecules of the liquid crystal layer 103. Therefore, before bonding the polarizers 104, the standing display panel 101 is required to be aligned for ensuring that the polarizers 104 can be precisely bonded to the substrates 102.

Referring to FIG. 1 again, the panel alignment apparatus 100 may comprise transport devices 110, at least one alignment detector 120, a first clamp 130 and two second clamps 140. The transport devices 110 may be rollers or robot arms for transporting the standing display panel 101 to a predetermined position. At this time, the polarizers 104 are not bonded on the display panel 101. In this embodiment, the transport devices 110 may be rollers which are disposed below the display panel 101 for transporting the standing display panel 101 to the predetermined position.

Referring to FIG. 1 again, the at least one alignment detector 120 of the present embodiment is arranged corresponding to the predetermined position and electrically connected to the first clamp 130 for detecting the position of the standing display panel 101 and outputting a position adjustment signal to the first clamp 130. In this embodiment, the alignment detector 120 may be an image detection device, such as a charge-coupled device (CCD) or a complementary metal oxide semiconductor (CMOS), for capturing an image of alignment marks (not shown) of the display panel 101. The alignment detector 120 can calculate a position adjustment value according to an image data of the alignment marks and output the position adjustment signal to the first clamp 130, and the first clamp 130 can adjust the position of the display panel 101 according to the position adjustment value.

Referring to FIG. 1 again, the first clamp 130 and the second clamps 140 are configured to clamp and hold the standing display panel 101 at a peripheral non-displaying region 105 thereof for aligning the standing display panel 101, thus preventing an active display region 106 of the display panel 101 from being affected by the clamps 130, 140. The peripheral non-displaying region 105 is formed around the active display region 106. The peripheral non-displaying region 105 is for example a black matrix (BM) region, which is formed around the active display region 106 for preventing a peripheral light leakage problem.

Figure 3A:
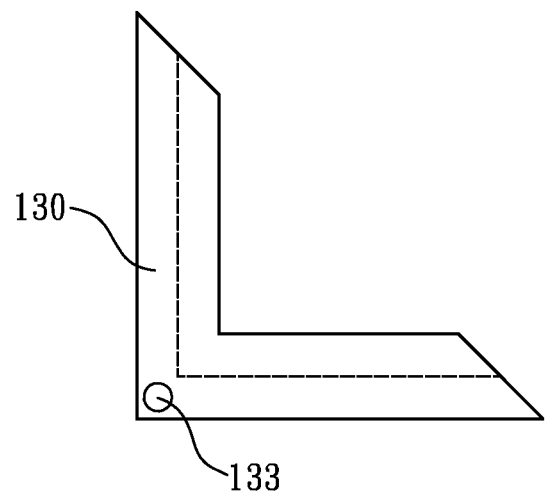
FIG. 3A is a front view showing the first clamp according to the first embodiment of the present invention.
Figure 3B:
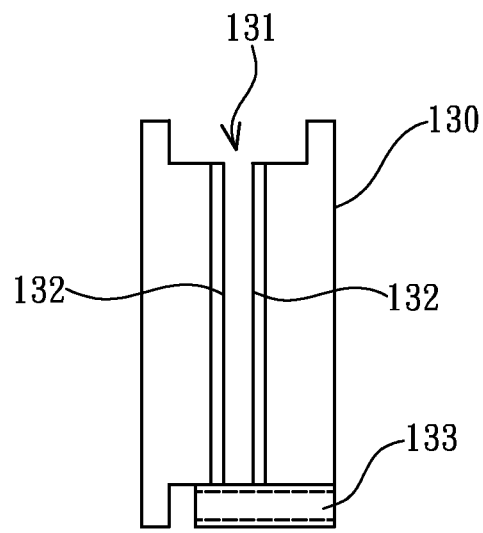
FIG. 3B is a left side view showing the first clamp according to the first embodiment of the present invention.

Referring to FIG. 1, FIG. 3A and FIG. 3B, FIG. 3A is a front view showing the first clamp according to the first embodiment of the present invention, and FIG. 3B is a left side view showing the first clamp according to the first embodiment of the present invention. The first clamp 130 of the present embodiment is configured to hold the display panel 101 at a corner thereof, and to rotate the display panel 101 according to the position adjustment signal for adjusting the position of the display panel 101. In this embodiment, the first clamp 130 is for example an L-shaped clamp which comprises a recess 131, buffer layers 132 and a rotation axle 133. An opening width of the recess 131 of the first clamp 130 is adjustable for clamping the display panel 101 or releasing the clamping for the display panel 101. The buffer layers 132 are formed on inner sidewalls of the recess 131. The buffer layers 132 are preferably made of a soft or flexible material, such as a plastic material, for preventing surfaces of the display panel 101 from being damaged by the first clamp 130 in clamping. The rotation axle 133 is pivotally connected to a driving device (not shown). With the driving of the driving device, the first clamp 130 can actively rotate around the rotation axle 133. Therefore, when the display panel 101 is clamped by the first clamp 130, the first clamp 130 can actively rotate the display panel 101 for adjusting the position thereof.

Figure 4A:
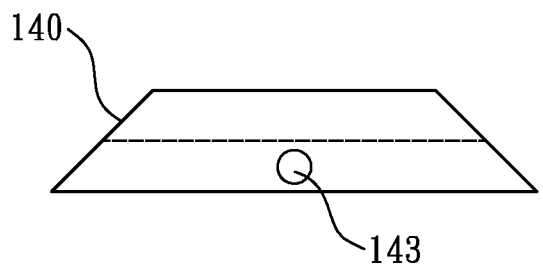
FIG. 4A is a front view showing the second clamp according to the first embodiment of the present invention.
Figure 4B:
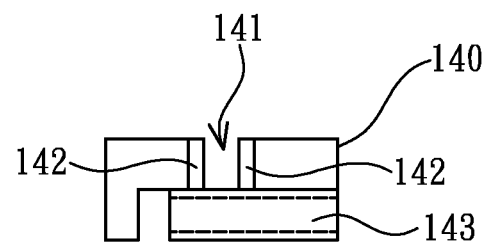
FIG. 4B is a left side view showing the second clamp according to the first embodiment of the present invention.
Figure 5A:
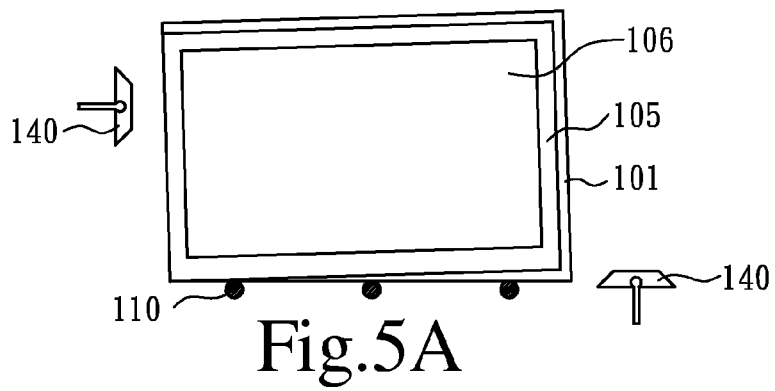
FIG. 5A through FIG. 5G are schematic diagrams showing the standing display panel in alignment according to the first embodiment of the present invention.
Figure 5B:
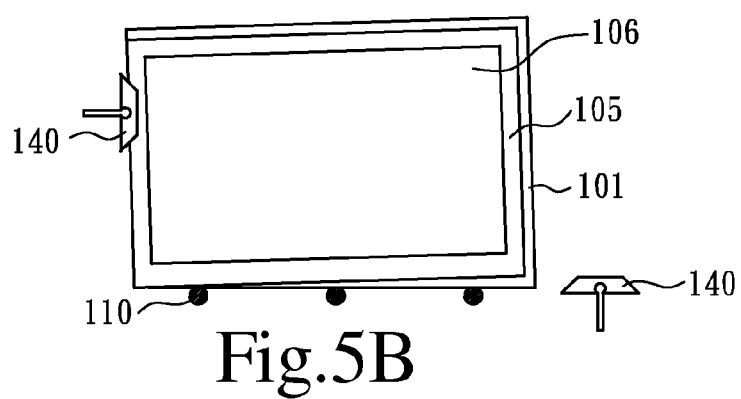
Figure 5C:
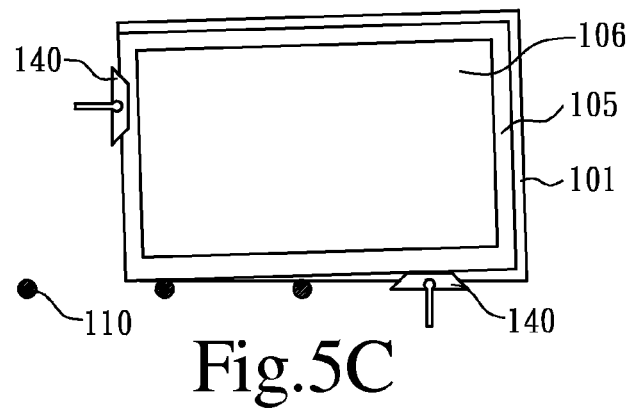
Figure 5D:
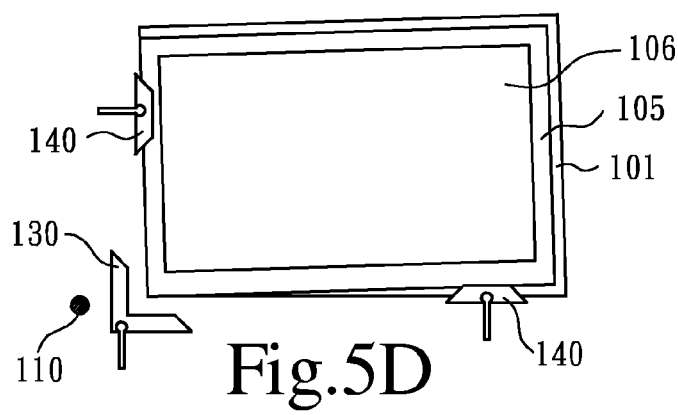
Figure 5E:
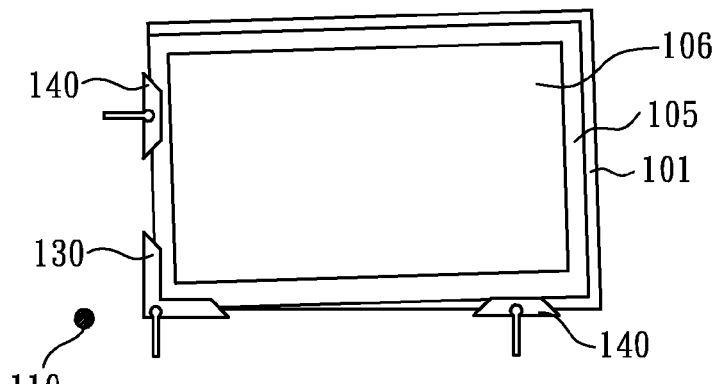
Figure 5F:
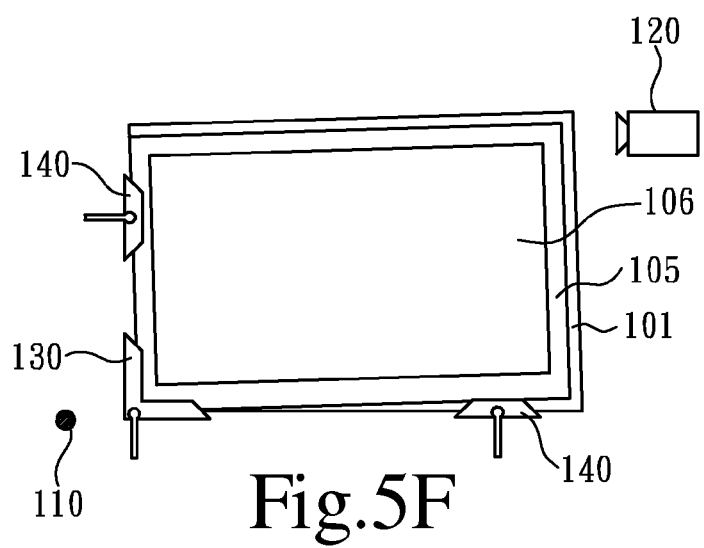
Figure 5G:
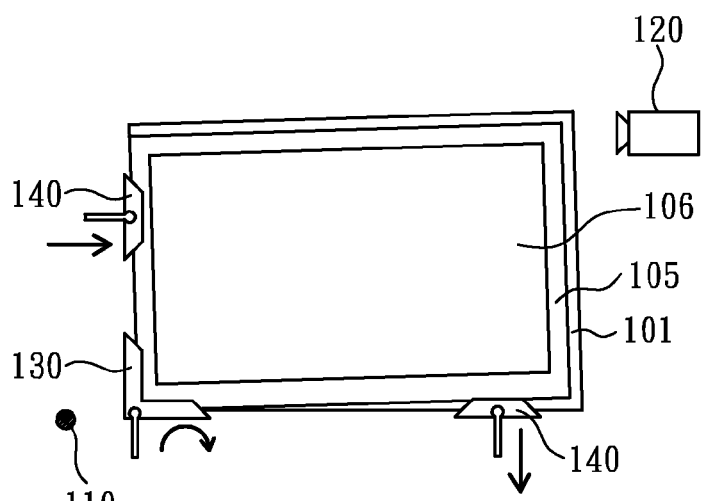
Figure 6A:
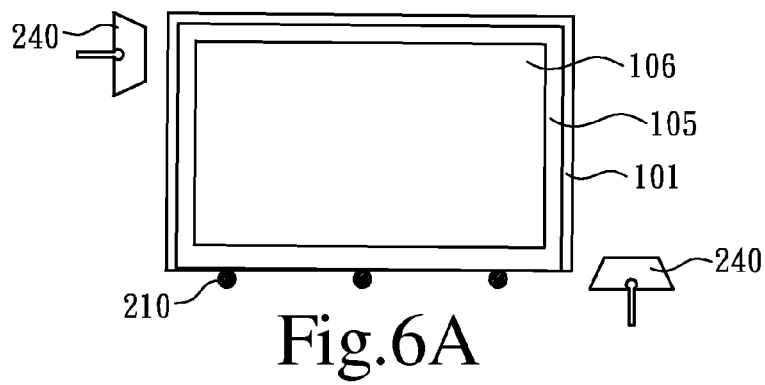
FIG. 6A through FIG. 6G are schematic diagrams showing the standing display panel in alignment according to a second embodiment of the present invention.
Figure 6B:
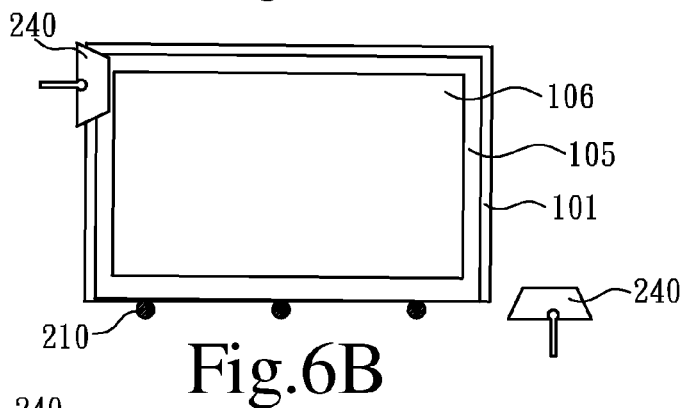
Figure 6C:
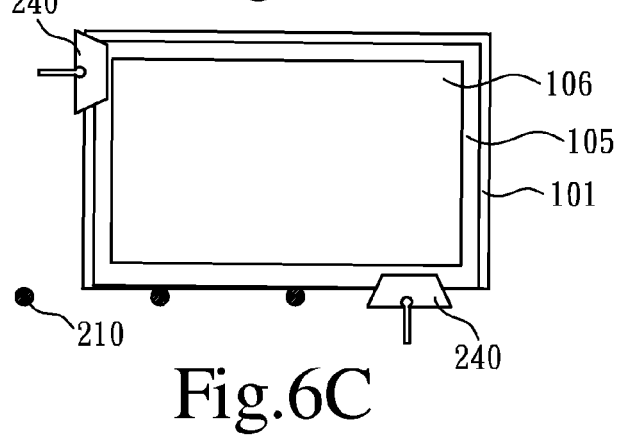
Figure 6D:
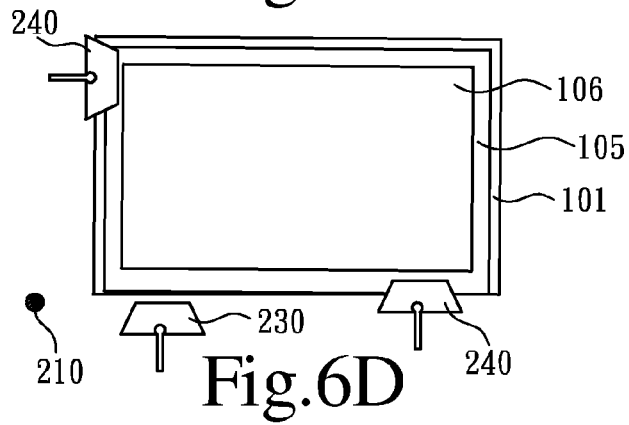
Figure 6E:
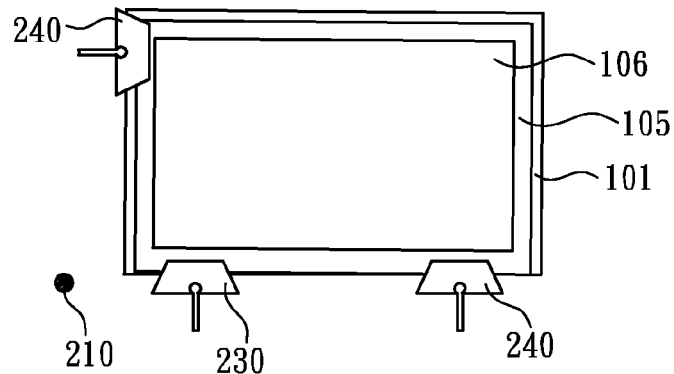
Figure 6F:
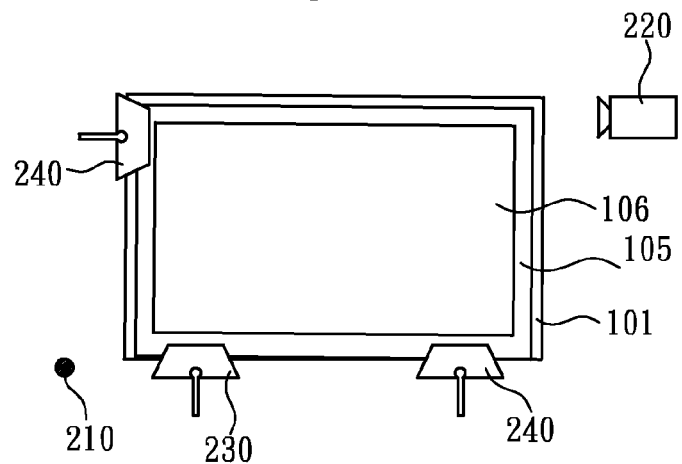
Figure 6G:
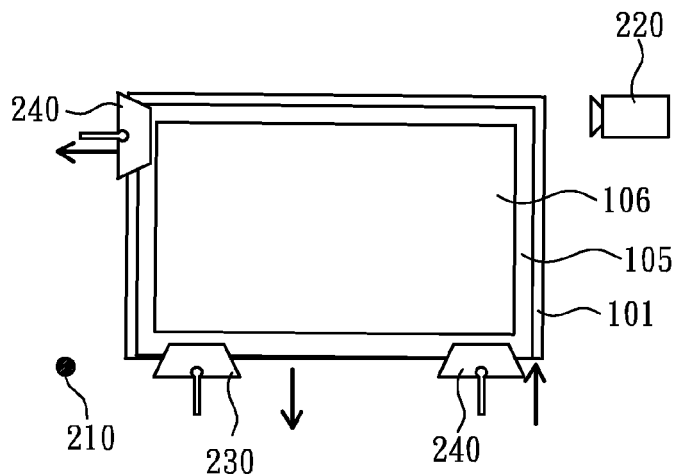

Referring to FIG. 1, FIG. 4A and FIG. 4B, FIG. 4A is a front view showing the second clamp according to the first embodiment of the present invention, and FIG. 4B is a left side view showing the second clamp according to the first embodiment of the present invention. The two second clamps 140 of the present embodiment can clamp the display panel 101 at a first side and a second side thereof respectively for securely holding the standing display panel 101 at the predetermined position, wherein the first side is preferably vertical to the second side. The second clamps 140 may be trapezoid or rectangular clamps which comprise recesses 141, buffer layers 142 and rotation axles 143. An opening width of the recess 141 of the second clamp 140 is adjustable for clamping the display panel 101 or releasing the clamping for the display panel 101. The buffer layers 142 are formed on inner sidewalls of the recesses 141. The buffer layers 142 are preferably made of a soft or flexible material, such as a plastic material, for preventing surfaces of the display panel 101 from being damaged by the second clamps 140 in clamping. When rotating the display panel 101, the second clamps 140 are allowed to be passively rotated around the rotation axles 143. Therefore, when the display panel 101 is aligned and clamped by the second clamps 140, the second clamps 140 can passively rotate corresponding to the rotation of the display panel 101. Furthermore, according to the rotation of the display panel 101, the second clamps 140 can move transversely or vertically for securely holding the standing display panel 101.

Referring to FIG. 5A through FIG. 5G, schematic diagrams showing the standing display panel in alignment according to the first embodiment of the present invention are illustrated. In an alignment method of the display panel 101, referring to FIG. 5A, firstly, the standing display panel 101 is provided on the transport devices 110 (such as rollers). At this time, in this embodiment, due to a poor cutting precision of the panel, the standing display panel 101 may have a lopsided panel problem, i.e. the alignment errors of the standing display panel 101 arise. Thus, the display panel 101 is required to be aligned. Subsequently, referring to FIG. 5B, one of the second clamps 140 is utilized to clamp and hold the display panel 101 at the first side thereof. Subsequently, referring to FIG. 5C, the display panel 101 is transported to the front of the predetermined position by the transport devices 110, and another one of the second clamps 140 is utilized to clamp and hold the display panel 101 at the horizontal second side thereof. Subsequently, referring to FIG. 5D, the standing display panel 101, which is transported by the transport devices 110, is positioned at the predetermined position by the second clamps 140. Subsequently, referring to FIG. 5E, the first clamp 130 is utilized to clamp and hold the standing display panel 101 at a corner thereof. Subsequently, referring to FIG. 5F, the alignment detector 120 is utilized to detect the position of the standing display panel 101, and to calculate a position adjustment value, and to output the position adjustment signal to the first clamp 130. Subsequently, referring to FIG. 5G, according to the position adjustment value, the first clamp 130 is utilized to rotate the display panel 101 for adjusting the position thereof. At this time, the second clamps 140 clamping at the first side and the second side are allowed to be passively rotated. Therefore, when the display panel 101 is rotated by the first clamp 130, the display panel 101 can be clamped and held by the second clamps 140 for ensuring the positioning stability.

Therefore, by using the panel alignment apparatus and the panel alignment method of the present embodiment, the standing panel can be precisely aligned. Even though the cutting precision of the panel is poor, the alignment apparatus 100 can correspondingly adjust the rotation angle, horizontal position or vertical position of the display panel 101, thereby greatly improving the position precision of the display panel 101. Furthermore, the display panel 101 is clamped at the peripheral non-displaying region 105 thereof by the clamps 130, 140, thereby preventing the active display region 106 of the display panel 101 from being damaged by the clamps 130, 140 and enhancing the quality thereof. Moreover, the quantity of the first clamp 130 and the second clamps 140 is less, thereby making it easier to maintain.

Referring to FIG. 6A through FIG. 6G, schematic diagrams showing the standing display panel in alignment according to a second embodiment of the present invention are illustrated. The alignment apparatus of the second embodiment may comprise transport devices 210, at least one alignment detector 220, a first clamp 230 and two second clamps 240. The first clamp 230 and the second clamps 240 may be trapezoid or rectangular clamps, wherein the first clamp 230 can actively rotate the display panel 101, and the second clamps 240 can move transversely or vertically corresponding to the rotation of the display panel 101. When utilizing the alignment apparatus to align the display panel 101, referring to FIG. 6A, firstly, the standing display panel 101 is provided on the transport devices 210. Subsequently, referring to FIG. 6B, one of the second clamps 240 is utilized to clamp and hold the display panel 101 at the first side thereof. Subsequently, referring to FIG. 6C, the standing display panel 101 is transported to the front of the predetermined position by the transport devices 210, and another one of the second clamps 140 is utilized to clamp and hold the display panel 101 at the horizontal second side thereof. Subsequently, referring to FIG. 6D, the standing display panel 101, which is transported by the transport devices 210, is positioned at the predetermined position by the second clamps 240. Subsequently, referring to FIG. 6E, the first clamp 230 is utilized to clamp and hold the standing display panel 101 at the horizontal second side and close to the corner thereof. Subsequently, referring to FIG. 6F, the alignment detector 220 is utilized to detect the position of the standing display panel 101, and to calculate a position adjustment value, and to output the position adjustment signal to the first clamp 230. Subsequently, referring to FIG. 6G, according to the position adjustment value, the first clamp 230 is utilized to rotate the display panel 101 for adjusting the position thereof. At this time, the second clamps 240 clamping at the first side and the second side are allowed to be passively rotated or moved. Therefore, when the display panel 101 is rotated by the first clamp 230, the display panel 101 can be clamped and held by the second clamps 240 for ensuring the positioning stability.

As described above, the panel alignment apparatus and the panel alignment method of the present invention can utilize the clamps to precisely align the standing panel. Even though the cutting precision of the panel is poor, the alignment apparatus can correspondingly adjust the position of the display panel, thereby enhancing the position precision of the display panel. Furthermore, the display panel is clamped at the peripheral non-displaying region thereof by the clamps, thereby enhancing the quality of the panel. Moreover, the quantity of the clamps of the alignment apparatus is less, thereby making it easier to maintain.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A panel alignment apparatus for aligning a standing display panel, wherein the display panel has a peripheral non-displaying region, and the panel alignment apparatus comprises:
   an image detection device configured to capture an image of alignment marks of the display panel, and to calculate a position adjustment value according to an image data of the alignment marks;
   a first clamp configured to hold the standing display panel at the peripheral non-displaying region, and to rotate the standing display panel according to the position adjustment value calculated by the image detection device for adjusting a position of the display panel; and
   at least one second clamp configured to hold the standing display panel at the peripheral non-displaying region, wherein the second clamp is allowed to be passively rotated or moved when the standing display panel is rotated.

2. A panel alignment apparatus for aligning a standing display panel, wherein the display panel has a peripheral non-displaying region, and the panel alignment apparatus comprises:
- an image detection device configured to detect a position of the display panel, and to calculate a position adjustment value;
- a first clamp configured to hold the standing display panel at the peripheral non-displaying region, and to rotate the standing display panel according to the position adjustment value calculated by the image detection device for adjusting a position of the display panel; and
- at least one second clamp configured to hold the standing display panel at the peripheral non-displaying region, wherein the second clamp is allowed to be passively rotated or moved when the standing display panel is rotated.

3. The panel alignment apparatus according to claim 2, further comprising transport devices configured to transport the standing display panel to a predetermined position.

4. The panel alignment apparatus according to claim 2, wherein the peripheral non-displaying region is a black matrix region.

5. The panel alignment apparatus according to claim 2, wherein the first clamp is an L-shaped clamp configured to clamp the display panel at a corner thereof.

6. The panel alignment apparatus according to claim 2, wherein the first clamp is a trapezoid or rectangular clamp configured to clamp the display panel at one side thereof.

7. The panel alignment apparatus according to claim 2, wherein the first clamp comprises a recess and buffer layers, and the buffer layers are formed on inner sidewalls of the recess.

8. The panel alignment apparatus according to claim 2, wherein the second clamp is a trapezoid or rectangular clamp configured to clamp the display panel at one side thereof.

9. A panel alignment method for aligning a standing display panel, wherein the method comprises the following steps:
- utilizing an image detection device to detect a position of the display panel, and to calculate a position adjustment value;
- utilizing a first clamp to hold the standing display panel at a peripheral non-displaying region thereof, and to rotate the standing display panel according to the position adjustment value calculated by the image detection device for adjusting a position of the display panel; and
- utilizing at least one second clamp to hold the display panel at a first side and a second side thereof before utilizing the first clamp to hold the display panel, wherein the second clamp is allowed to be passively rotated or moved when the standing display panel is rotated.

10. The panel alignment method according to claim 9, further comprising the following step:
- utilizing transport devices to transport the standing display panel to a predetermined position before detecting the position of the display panel.

* * * * *